US009471959B2

(12) United States Patent
Teitlebaum et al.

(10) Patent No.: US 9,471,959 B2
(45) Date of Patent: Oct. 18, 2016

(54) WATER COLOR GRADIENTS ON A DIGITAL MAP

(71) Applicant: GOOGLE INC., Mountain View, CA (US)

(72) Inventors: David Teitlebaum, Seattle, WA (US); Jonah Jones, San Francisco, CA (US); Sean Egan, Seattle, WA (US)

(73) Assignee: GOOGLE INC., Mountain View, CA (US)

( * ) Notice: Subject to any disclaimer, the term of this patent is extended or adjusted under 35 U.S.C. 154(b) by 250 days.

(21) Appl. No.: 13/895,029

(22) Filed: May 15, 2013

(65) Prior Publication Data
US 2014/0340416 A1  Nov. 20, 2014

(51) Int. Cl.
*G06T 11/00* (2006.01)
*G06T 3/40* (2006.01)
*G09G 5/02* (2006.01)
*G09G 5/06* (2006.01)

(52) U.S. Cl.
CPC ............ *G06T 3/4092* (2013.01); *G06T 11/00* (2013.01); *G06T 11/001* (2013.01); *G06T 3/40* (2013.01); *G09G 5/02* (2013.01); *G09G 5/06* (2013.01); *G09G 2320/0666* (2013.01); *G09G 2340/06* (2013.01)

(58) Field of Classification Search
None
See application file for complete search history.

(56) References Cited

U.S. PATENT DOCUMENTS

| | | | |
|---|---|---|---|
| 7,545,984 B1 * | 6/2009 | Kiel et al. .................... 382/220 |
| 7,817,871 B2 | 10/2010 | Chaudhury et al. | |
| 8,095,434 B1 * | 1/2012 | Puttick et al. ............... 705/26.9 |
| 2005/0232507 A1 * | 10/2005 | Zimmer ......................... 382/264 |
| 2005/0286794 A1 * | 12/2005 | Brunner et al. .............. 382/264 |
| 2009/0202170 A1 * | 8/2009 | Weiss ............................ 382/275 |
| 2010/0098350 A1 | 4/2010 | Zimmer | |
| 2011/0210960 A1 | 9/2011 | Touma et al. | |
| 2012/0070071 A1 * | 3/2012 | Rankin et al. ................ 382/154 |
| 2013/0063440 A1 | 3/2013 | Son et al. | |
| 2013/0339891 A1 * | 12/2013 | Blumenberg et al. ........ 715/771 |

FOREIGN PATENT DOCUMENTS

WO  WO-2007/093864 A1  8/2007

OTHER PUBLICATIONS

Game Rendering, "Radial Blur Filter," (2008). Retrieved from the Internet on Jul. 18, 2013: URL:http://www.gamerendering.com/2008/12/20/radial-blur-filter/.

* cited by examiner

*Primary Examiner* — Mark Zimmerman
*Assistant Examiner* — Yu-Jang Tswei
(74) *Attorney, Agent, or Firm* — Marshall, Gerstein & Borun LLP

(57) ABSTRACT

To generate a description of a raster map image that includes a representation of a body of water having a color gradient that appears constant in response to a zoom operation, a description of geometry of the body of water is generated for a selected geographic area. Using a raster representation of the body of water having a color gradient, at least two blur raster images are generated: a first blur raster image is generated using a first blur radius, and a second blur raster image is generated using a second blur radius different from the first blur radius. The description of the geometry of the body of water, the first blur raster image, and the second blur raster image are provided to a client device for generating raster map images of the selected geographic area.

24 Claims, 14 Drawing Sheets

WATER COLOR GRADIENTS ON A DIGITAL MAP

FIELD OF TECHNOLOGY

The present disclosure relates generally to generating raster images for digital maps, and, more particularly, to generating raster images including stylized borders between land and water.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A digital map can include patches of color to depict bodies of water, forested areas, ice sheets, etc. In some cases, a color gradient can be introduced to a patch of color to make the contrast between the patch and adjacent graphical elements sharper. For example, a sea can be represented by a shape filled with a constant shade of blue, except that a darker shade of blue near the coastline makes the boundary between water and land more clear. In other words, representations of bodies of water can be stylized.

Patches of color can be provided to client devices as raster (bitmap) images. Further, a server can provide a client device with blurred raster images of map elements for generating certain visual effects, such as a stylized body of water, rather than relying on the client device to perform the blurring operation. This server-side blurring operation reduces bandwidth costs to the client device, because the generation of a blurred region requires source data from raster images larger than the final blurred result (i.e. a pixel in the blurred result gets color contributions from surrounding pixels). In addition, the server-side blurring operation saves the client device from doing the computationally expensive work of generating a blur. However, unlike vector graphics content, bitmap images generally do not scale well. In the example above, naively scaling a stylized representation of a body of water can make the stylized land/water margin too wide or too narrow, depending on whether the image with the stylized gradient was enlarged or reduced.

SUMMARY

The techniques of this disclosure allow the apparent blur radius of raster representations of a body of water, in which coastline water is illustrated with different (darker) colors for better contrast, to remain visually constant during zooming. For a particular zoom level, a radius-specific blur engine generates a "water coverage" raster image, where the "water coverage" raster image describes the shape of the body of water. The map server also generates at least two blur raster images: (i) a "full-radius" blur raster image by applying a blur function to the water coverage raster image with a certain blur radius, and (ii) a "fractional-radius" blur raster image by applying a blur function to the water coverage raster image with a different blur radius. The map server provides these three raster images—the water coverage, full-radius blur, and fractional-radius blur raster images— along with a "background" raster image to a client device for displaying a map at the particular zoom level. A mapping application on the client device, which can be a web browser or a special-purpose application, generates a digital map using the water coverage, full-radius blur, and fractional-radius blur raster images blended with the background raster image. In some cases, the mapping application also renders vector graphics map content. When the user zooms in or out on the map, the mapping application interpolates between the full-radius blur raster image and the fractional-radius blur raster image to present the body of water with a visually constant color gradient (i.e. a constant apparent blur radius) at borders between land at water.

In particular, one example implementation of the techniques of the present disclosure is a method for generating a description of a raster map image that includes a representation of a body of water having a color gradient that appears constant in response to a zoom operation. The method is implemented in a network device and includes generating a description of geometry of the body of water for a selected geographic area. Further, the method includes generating a first blur raster image using a first blur radius and a second blur raster image using a second blur radius different from the first blur radius using a raster representation of the body of water having a color gradient. Still further, the method includes providing the description of the geometry of the body of water, the first blur raster image, and the second blur raster image to a client device for generating raster map images of the selected geographic area.

Another example implementation of the techniques of the present disclosure is a method for scaling a raster image for a selected geographic area, where the raster image includes a representation of a body of water having a color gradient, implemented in a computing device. The method includes receiving a description of geometry of the body of water for a selected geographic area and receiving a first blur raster image along with a second blur raster image for rendering the body of water with a color gradient, where the first blur raster image and the second blur raster image are associated with a first blur radius and a second blur radius, respectively. The method further includes generating a raster image for a starting zoom level using the description of geometry of the body of water and the first blur raster image, and generating a plurality of raster images at different zoom levels other than the starting zoom level using the description of the geometry of the body of water, the first blur raster image, and the second blur raster image.

Yet another example implementation of the techniques of the present disclosure is a method in computing device for generating a raster image having a patch of color having a non-zero color gradient. The method includes receiving (i) a first blur raster image generated from the patch of color using a first blur radius corresponding to a first zoom level, (ii) a second blur raster image generated from the patch of color using a second blur radius corresponding to a second zoom level, and (iii) a description of geometry of the patch of color. The method further includes generating the raster image for an intermediate zoom level between the first zoom and the second zoom level, including: interpolating between the first blur raster and the second blur raster to generate an interpolated blur raster image for the intermediate zoom level, and applying the description of geometry of the patch of color to the interpolated blur raster image.

In still another implementation, a device includes means for generating a description of a raster map image that includes a representation of a body of water having a color gradient that appears constant in response to a zoom operation. The device may also include means for generating a description of geometry of the body of water for a selected geographic area and means for generating a first blur raster image using a first blur radius and a second blur raster image using a second blur radius different from the first blur radius using a raster representation of the body of water having a color gradient. The device may also include means for providing the description of the geometry of the body of water, the first blur raster image, and the second blur raster image to a client device for generating raster map images of the selected geographic area.

DETAILED DESCRIPTION

Overview

Figure 1:
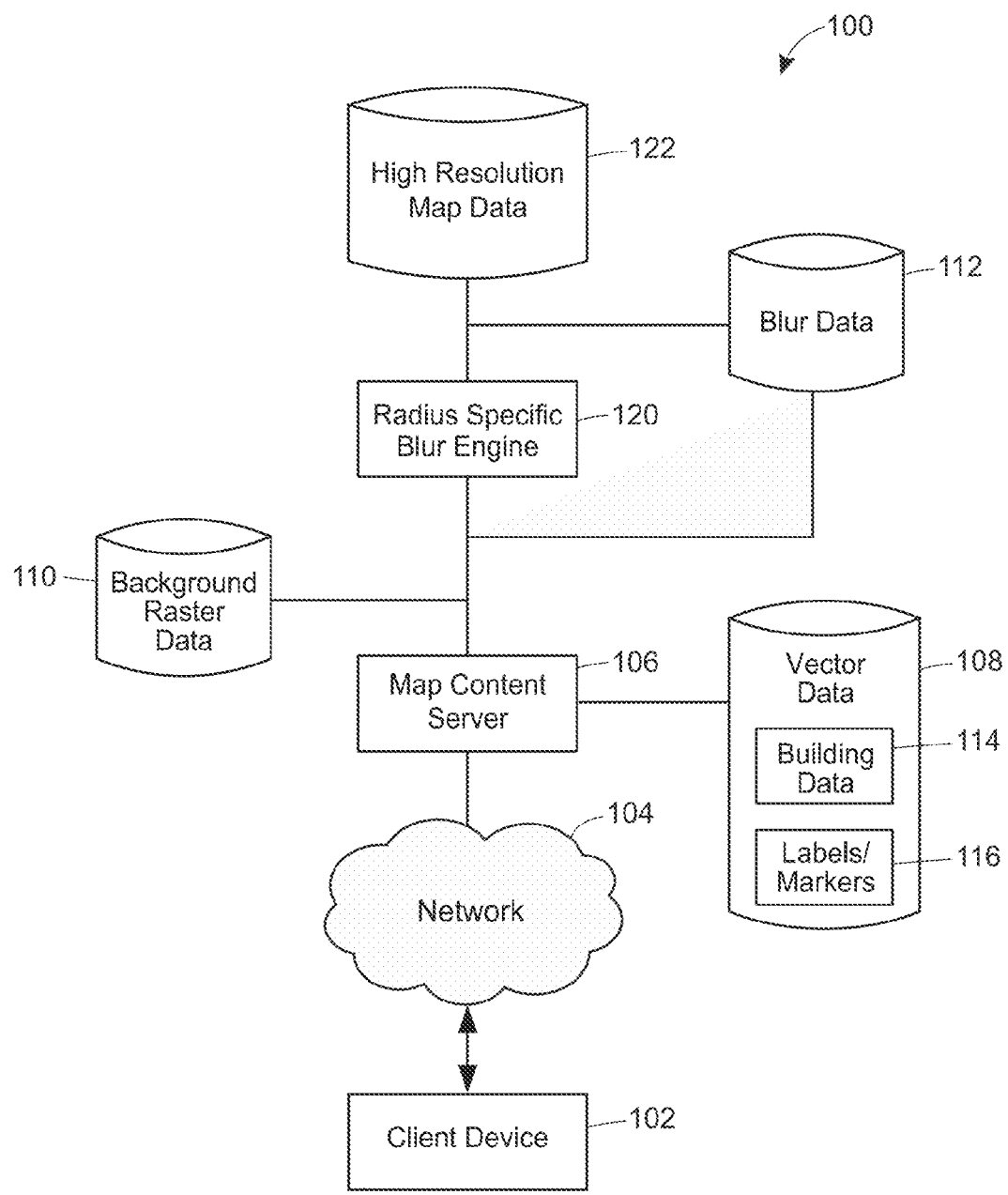
FIG. 1 illustrates an example computing environment in which users of a client device can zoom in on a digital map while apparent blur radii remain visually constant.

The techniques of this disclosure allow the apparent blur radius of stylized raster representations of a body of water, in which coastline water is illustrated with different (darker) colors for better contrast, to remain visually constant during zooming. In other words, as the user zooms in or out, the width in pixels of the darker coastline water remains substantially the same, rather than expand or contract with other map elements.

For zoom level N, a radius-specific blur engine operating in a map server, for example, generates a "water coverage" raster image. The water coverage raster image can describe the geometry of the body of water using a binary color scheme, such as black-and-white, and can operate as a binary mask in application to blur raster images. The map server also generates at least two blur raster images: (i) a "full-radius" blur raster image by applying a blur function to the water coverage raster image with a certain blur radius (e.g., 32 pixels), and (ii) a "fractional-radius" blur raster image by applying a blur function to the water coverage raster image with a different blur radius (e.g., 16 pixels). The map server can use any suitable blurring technique such as Gaussian blurring, for example.

A blur raster image allows the client device to display bodies of water with a color gradient to sharpen the contrast between water and land near the coastline. The fractional-radius blur raster can correspond to zoom level N±1, but in general the fractional-radius blur raster image need not correspond to an adjacent zoom level, or even a discrete zoom level. Moreover, the server can generate two or more different fractional-radius blur raster images, for different fractional increments of zooms.

The map server provides these three raster images—the water coverage, full-radius blur, and fractional-radius blur raster images—to a client device for displaying a map at zoom level N. According to one implementation, the map server encodes the three raster images using the three color channels of a 24-bit, 48-bit, or another suitable RGB color scheme. The map server also can provide a "background" raster image that depicts, for example, terrain information, smaller roads, residential subdivisions, etc. Further, the map server in some implementations provides vector-based descriptions of such map elements as roads and building footprints to a client.

A mapping application on the client device generates the map using, in relevant part, the water coverage, full-radius blur, and fractional-radius blur raster images blended with the background raster image. When the user zooms in or out on the map, the mapping application linearly interpolates between the full-radius blur raster image and the fractional-radius blur raster image to present the body of water with a visually constant color gradient (i.e. a constant apparent blur radius) at borders between land and water.

More generally, the techniques of this disclosure can be applied to any patch of color, such a representation of a forested area on a digital map, for example. Moreover, these techniques need not be limited to digital maps. However, for clarity, the examples below continue to refer to generating stylized representations of bodies of water in digital maps.

Example Computing Environment

FIG. 1 illustrates an example computing environment in which a zooming operation may be performed on a digital map while apparent blur radii remain visually constant. The example computing environment 100 includes a client device 102 communicatively coupled to the network 104, which can be any suitable mobile and/or wide area network, such as the Internet. By way of example, the client device 102 may be a smartphone, tablet computer, laptop computer, desktop computer, etc. Further details of an example client device are discussed with reference to FIG. 2.

The client device 102 may execute a mapping application to display digital maps to a user, where the digital maps include map content downloaded from a map content server 106. For example, the mapping application may be a special-purpose mapping application available at an online application store disposed at the map content server 106 or an application server (not shown). A user of the client device 102 may retrieve a copy of the mapping application from the application server and "install" the retrieved copy of the mapping application on the client device 102. Alternatively, the mapping application can be a web browser application, such as Google Chrome® browser, Microsoft Internet Explorer® browser, Apple's Safari® browser, etc.

In some scenarios, the client device 102 may display digital maps, constructed from multiple map tiles (e.g., 256 by 256 pixels images), including borders between land and water, such as beaches, lake shores, river banks, etc. (collectively called "coastlines" in the following description). For example, a user of the client device 102 may identify a city located along a coastline, such as New York, N.Y. or Miami, Fla., via a geographic query, and the mapping application may display a digital map of the identified city, where portions of the digital map include representations of water. In some implementations, a digital map of a coastline includes water color gradients to sharpen the contrast between water and land near the coastline. Although borders between water and land are discussed in the following description, the techniques of the disclosure may be applied to any suitable border in a digital map, such as borders between forests and meadows, concrete and grass, etc.

In an implementation, a map tile, making up a portion of a digital map, may be generated by overlaying, blending, and/or otherwise combining: (i) vector graphics stored in a vector database 108, (ii) background raster images stored in a background raster database 110, and (iii) water coverage/blur raster images stored in a blur database 112. By way of example, the vector database 108 may include geometric definitions of building in building data 114, map labels/markers 116, and/or any suitable vector graphics. Background raster images may include raster images used for shading, texture, patterns, insignificant map features, etc., and water coverage/blur raster images may be utilized to generate water color gradients. Further details regarding the generation of map tiles with water color gradients are discussed with reference to FIG. 7.

A radius-specific blur engine 120 can generate the blur data (e.g. the water coverage raster images and the blur raster images) and store the generated blur data in the blur database 112, in an implementation. For example, the radius specific blur engine may analyze high resolution images of a geographic area, stored in a high resolution map database 122, to generate blur data, where the high resolution images are vector graphics images or high resolution bitmap images. In some implementations, the radius-specific blur engine generates and stores blur data corresponding a plurality of fixed zoom levels for digital maps with borders between land and water. For example, a mapping application may allow a user to view a digital map, including a coastline, at a pre-defined number of zoom levels, and the radius-specific blur engine 120 may generate blur data corresponding to each of the pre-defined zoom levels.

Figure 2:
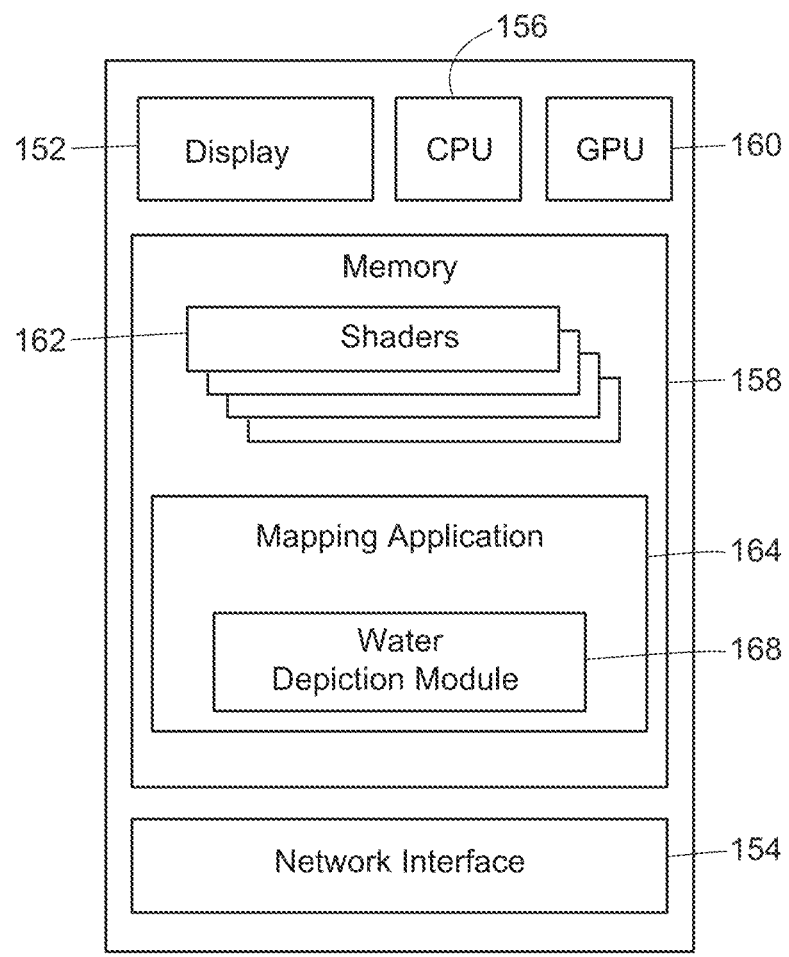
FIG. 2 illustrates an example client device that can operate in the example computing environment illustrated in FIG. 1.

FIG. 2 illustrates an example client device 150 which can display digital maps having visually constant blur radii. The client device 150 includes a display device 152 on which digital maps may be displayed, such as a liquid crystal display (LCD), light emitting diode (LED) display, organic LED (OLED) display, etc., a network interface 154 to facilitate communications over a network, such as network 104, a CPU 156 for executing computer-readable instructions stored in a memory 158, and a graphics processing unit (GPU) 160 for rendering images to be displayed on the display device 152. The memory 158 may also include a mapping application 164 with a water depiction module 168 for generating visually constant water color gradients at borders between water and land in a digital map image.

In some implementations, the memory 158 stores a plurality of shaders 162 for describing and/or defining the traits (e.g. position, colors, etc.) of portions of raster images to be displayed on the display device 152. For example, the plurality of shaders 162 may include pixel shaders, vertex shaders, geometry shaders, etc. which can be executed by the GPU 160. Although the plurality of shaders 162 are shown as stored in the memory 158, some or all of the shaders may be part of one or more shader "pipelines" in the GPU 160, as known in the industry, in an implementation.

Generating and Using Raster Images

Figure 3:
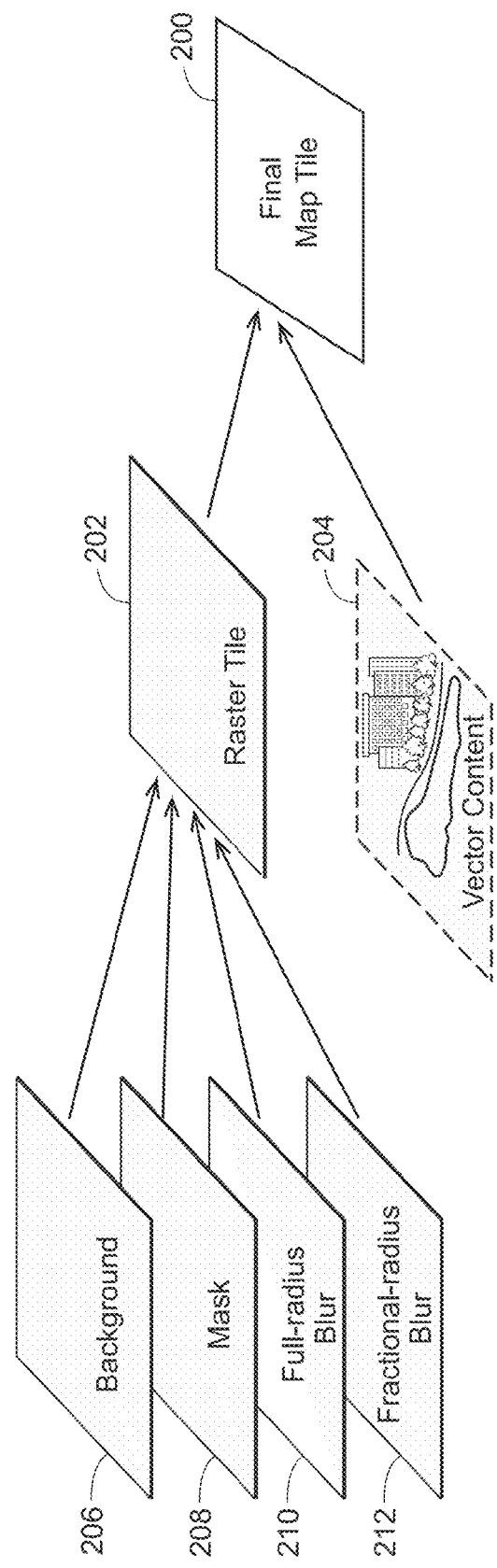
FIG. 3 is a diagram of the construction of a map tile, which can be implemented in the example computing environment illustrated in FIG. 1.
Figure 4A:
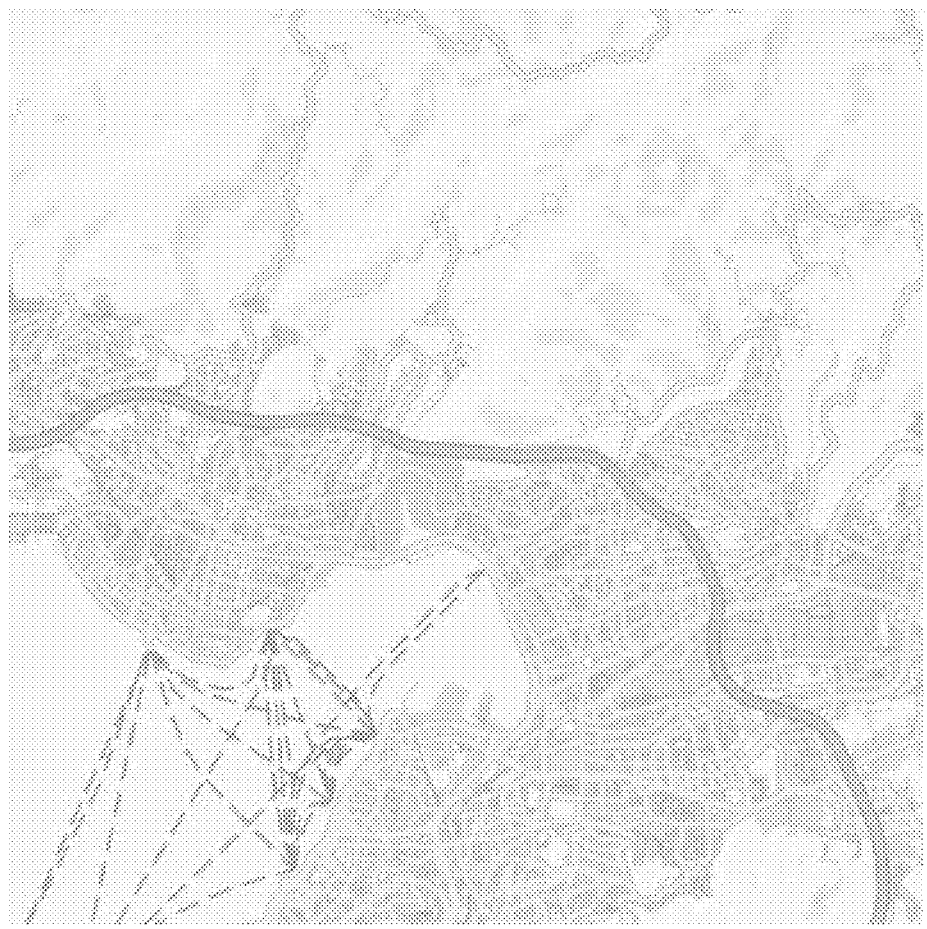
FIGS. 4A, 4B, 4C, and 4D are example background, water coverage, full-radius blur, and fractional radius blur raster images which can be generated in the computing environment illustrated in FIG. 1.
Figure 4B:
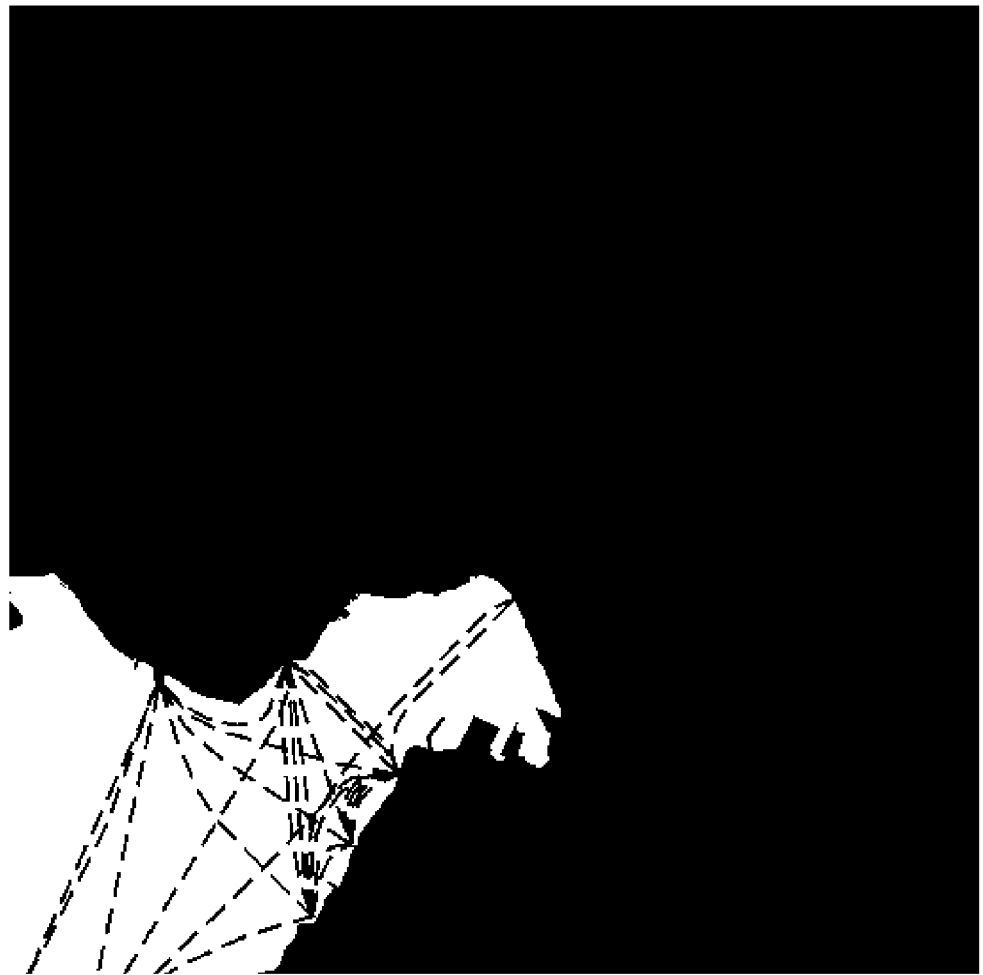
Figure 4C:
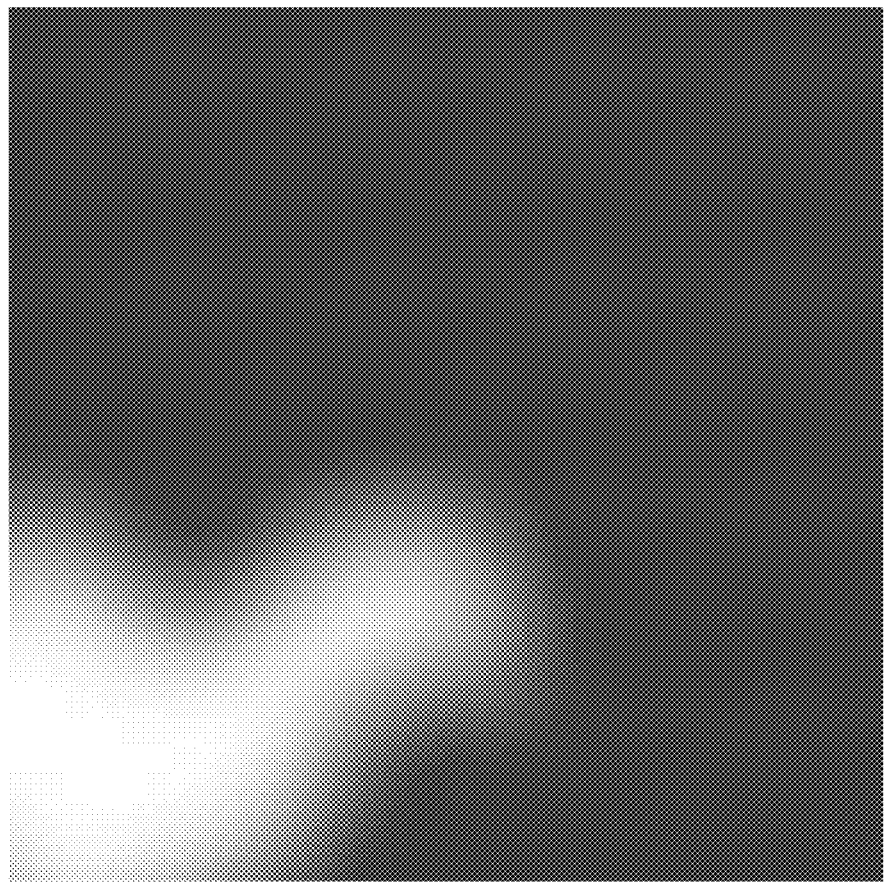
Figure 4D:

FIG. 3 is a simplified diagram illustrating the various map content components that are blended or otherwise used together to generate map tiles that include visually constant water color gradients. In some implementations, a final map tile 200, for display on a client device, is a combination of a raster image tile 202 and vector graphics content 204. For example, the mapping application 164 may use the raster image tile 202 as a background (e.g. including shading, colors, insignificant map features, etc.) on which the vector content 204 may be overlaid, where the vector content 204 may include significant map features such as building footprints, markers, routes, borders, etc.

In order to construct the raster image tile 202 with apparent blur radii that are constant during zooming, a mapping application may blend, or otherwise combine, a background raster image 206, a mask 208, a full-radius blur raster image 210, and a fractional-radius blur raster image 212. The mask 208 may be, or be derived from, a water coverage raster image, as described below, and, in some implementations, the full-radius blur raster image 210 and the fractional-radius blur raster image 212 are blended so that apparent blur radii are constant during zooming. In some implementations, the mapping application linearly interpolates between two or more blur raster images Exemplary background, water coverage, full-radius blur, and fractional radius-blur raster images have been included in FIGS. 4A-4D, respectively. Also, for clarity, FIGS. 5A-5D illustrate example characteristics of background, water coverage, full-radius blur, and fractional radius-blur raster images used to generate apparent blur radii that are constant during zooming.

Figure 5A:
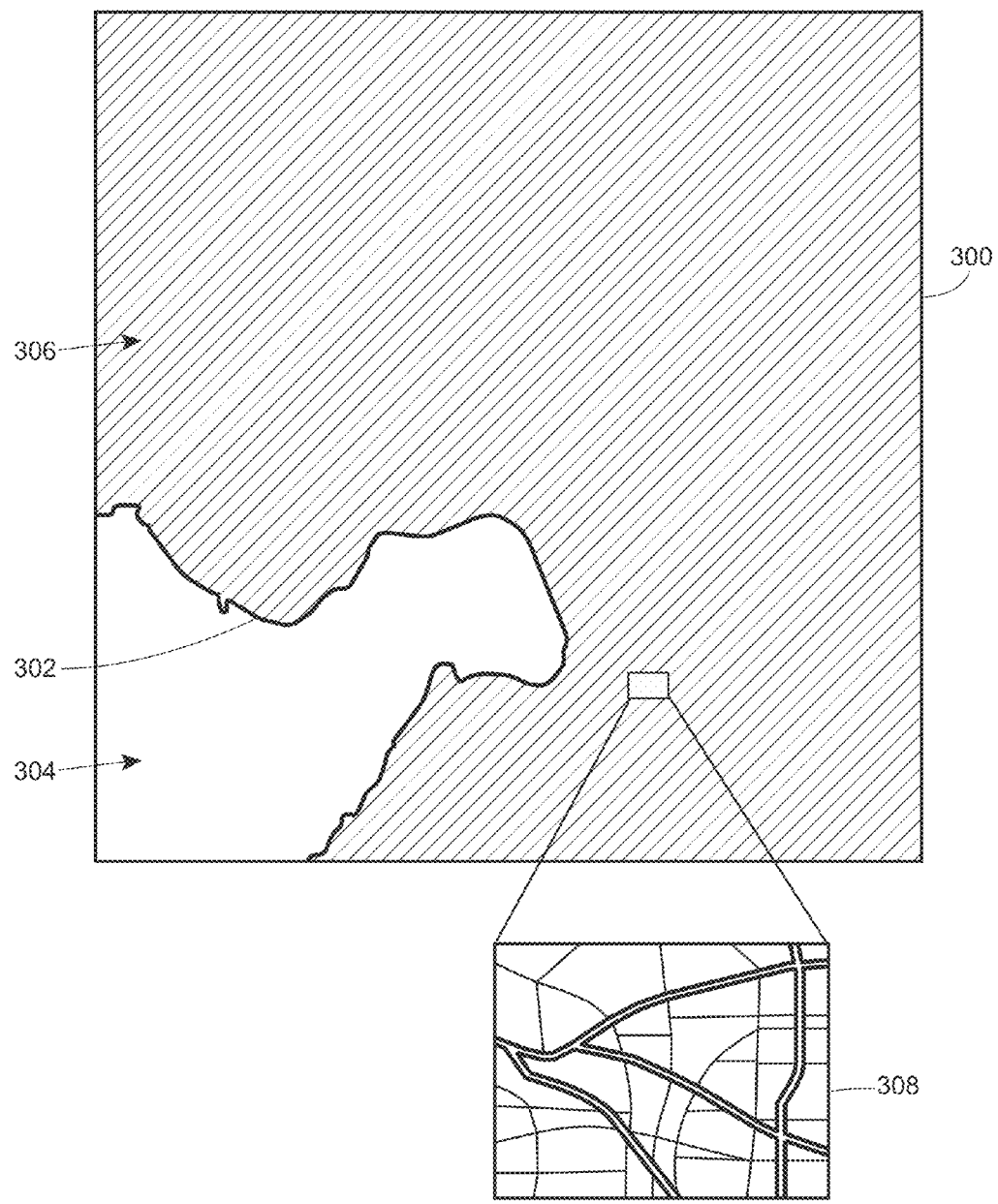
FIGS. 5A, 5B, 5C, and 5D schematically illustrate example background, water coverage, full-radius blur, and fractional radius blur raster images which can be generated in the computing environment illustrated in FIG. 1.

In particular, FIG. 5A illustrates an example background raster image 300 corresponding to a map tile at a first zoom level in which a coastline 302 is visible. For example, the area 304 represents water and may be shaded with a blue color, and the area 306 represents land and may be shaded with grey, green, etc. colors. Moreover, in some implementations, the area 306 may include raster representations of insignificant (i.e. not visually prominent, not heavily trafficked, etc.) roads, natural geographic features, etc., as illustrated in the expanded view 308.

The background raster image 300 may include a representation of the coastline 302 where the border between land and water is only recognizable by a difference in water color and land color, in some scenarios. This difference in color may not result is a crisp or visually appealing depiction of the coastline 302 in a final map tile. Therefore, a server, such as the radius-specific blur engine 120, may generate blur data to be blended with the background raster image 300.

Figure 5B:

FIG. 5B illustrates a water coverage raster image 320 generated from a high resolution image of the map tile area at the first zoom level. For example, the radius-specific blur engine 120 may retrieve a high resolution image of the map tile area, covered by the background raster image 330, from the high resolution map database 122. The radius-specific blur engine 120 may then generate a binary (e.g. two color) image based on the high resolution image of the map tile area in which the geometry, or shape, of the coastline 302 is defined at high resolution (i.e. without blurring or downsampling), for example.

Figure 5C:
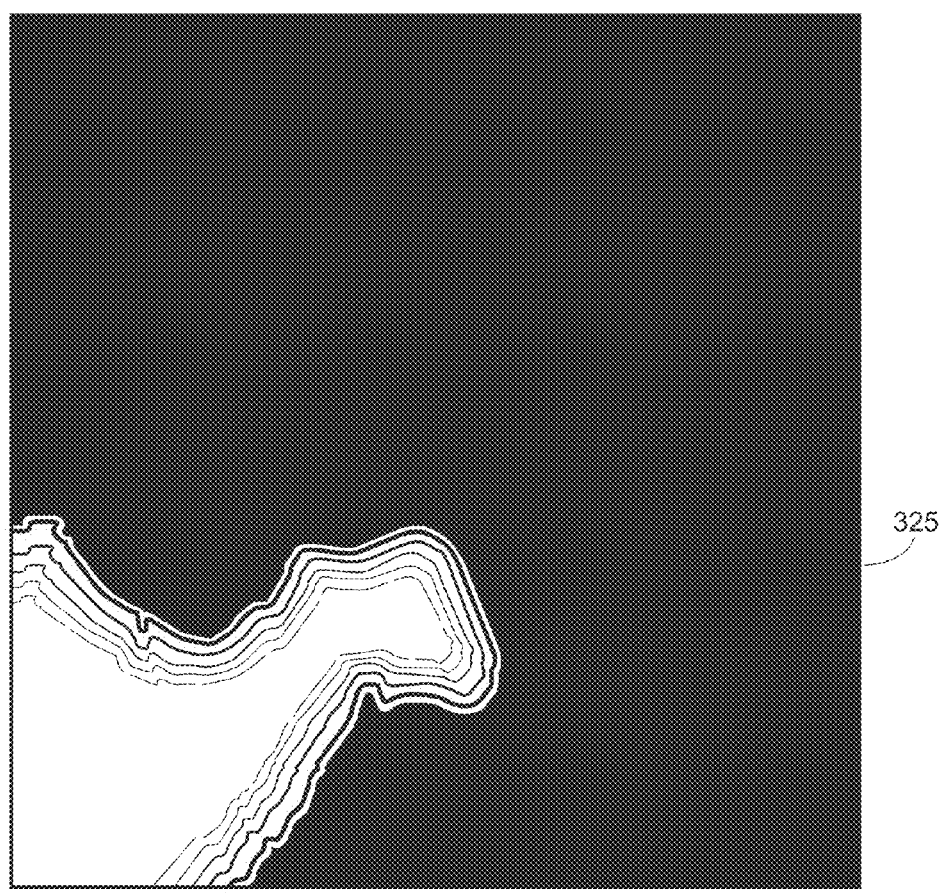

FIG. 5C illustrates a full-radius blur raster image 325 in which the water coverage raster image 320 is blurred with a "full-radius" blur radius. That is, the full-radius blur raster image 325 results from applying a blur function using a maximum, or default, blur radius, in an implementation. For example, when a digital map is displayed at the first zoom level, a mapping application may use full-radius blur images to create water color gradients by blending the full-radius blur raster image 325 with the background raster image 300. Further, the mapping application may use the water coverage raster image 320 as a mask to blend the full-radius blur raster image 325 with the background raster image 300 such that only the area representing water has a color gradient, not the area representing land.

Figure 5D:
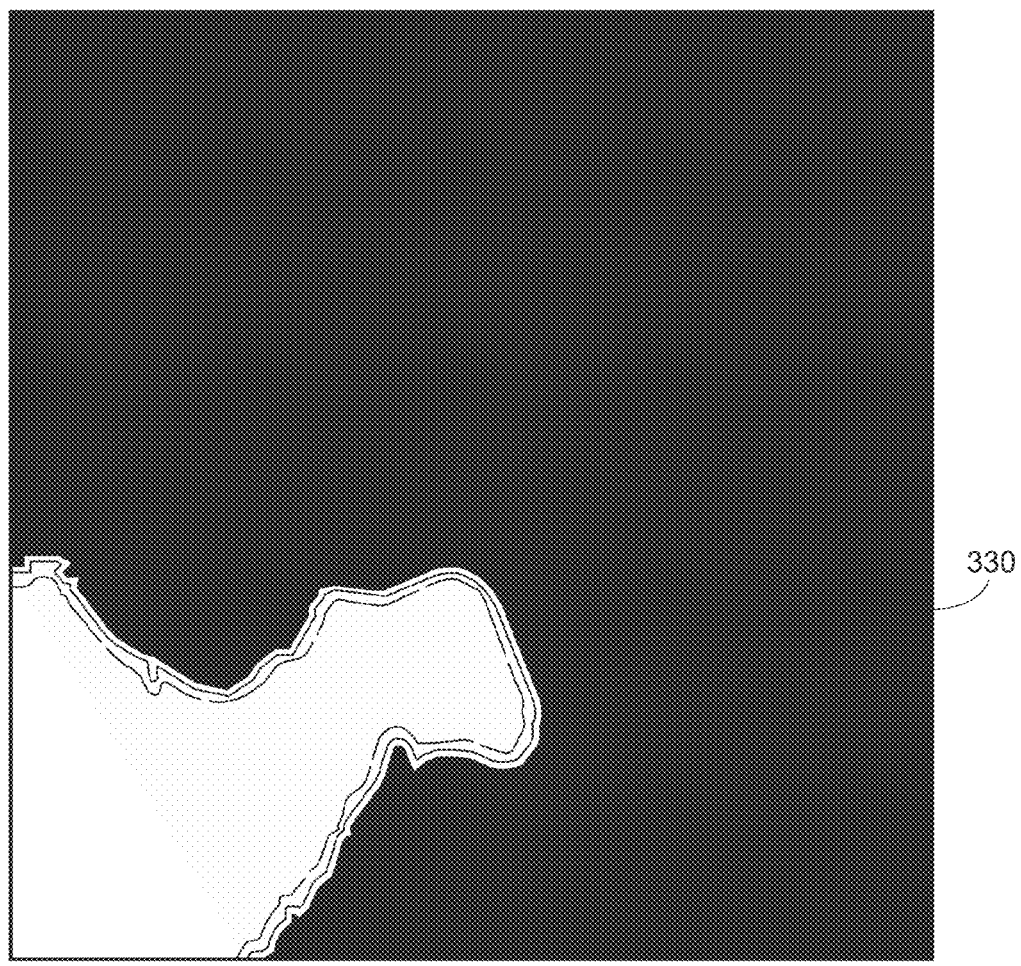

FIG. 5D illustrates a fractional-radius blur radius image 330 in which the water coverage raster image 320 is blurred with a "fractional-radius" blur radius. That is, the fractional-radius blur raster image 330 results from applying a blur function using a blur radius less than the full-radius to the water coverage raster image 320, in an implementation.

Figure 6A:
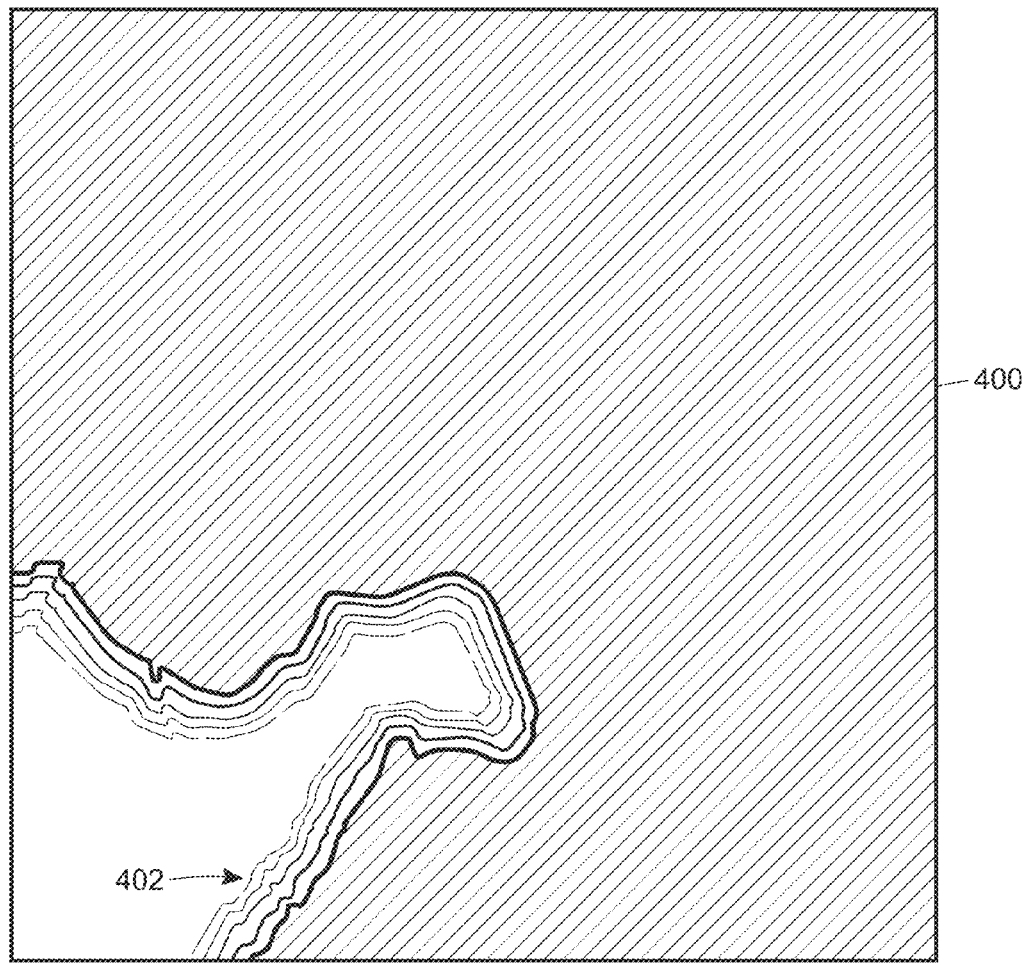
FIGS. 6A and 6B illustrate a digital map background, which can be generated using the raster images illustrated in FIGS. 5A, 5B, 5C, and 5D.
Figure 6B:
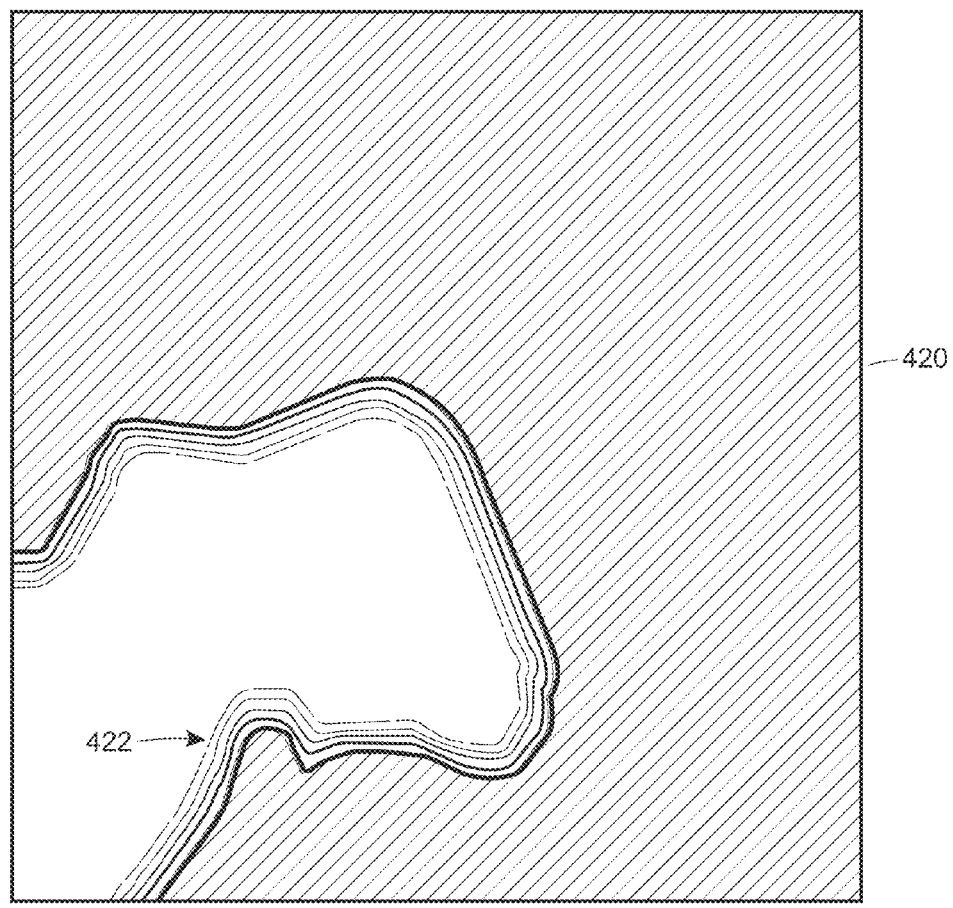

FIG. 6A and FIG. 6B illustrate an example apparent blur radius that remains constant during zooming, where the apparent blur radius may be generated by blending or otherwise combining the raster images illustrated in FIGS. 5A-5D. In particular, FIG. 6A illustrates an example digital map image 400 that includes a water color gradient 402. For example, a mapping application may generate the water color gradient 402, at this zoom level, based on a blend of the full-radius blur raster image 325, the water coverage raster image 320, and the background raster image 300.

FIG. 6B illustrates a zoomed-in view 420 of the example digital map 400, where the zoomed-in view 420 is at an intermediate zoom level (i.e. a zoom level in between two fixed zoom levels). Although the view of the background raster image is enlarged, the zoomed in view 420 includes a water color gradient 422 with an apparent blur radius that is the same as the apparent blur radius of the water color gradient 402. That is, as a mapping application zooms from the digital map image 400 to the zoomed in view 420, the apparent blur radius of the water color gradient does not increase in size. In order to maintain the constant gradient, a mapping application may blend both a full-radius and fractional radius blur raster image along with a water coverage and background raster image, in an implementation.

Blending the full-radius and fractional radius blur raster images may be preferable, in many scenarios, to generating additional blur data specifically for the intermediate zoom level. For example, some blurring functions may be computationally expensive, especially when applied to many map tiles. Thus, it may be preferable to only generate blur data for a pre-defined number of zoom levels and blend, or interpolate between, the blur data when displaying a map at an intermediate zoom level.

Figure 7:
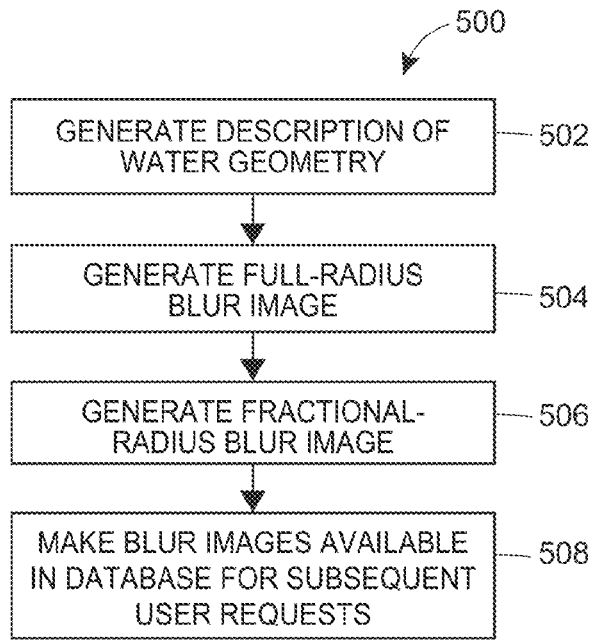
FIG. 7 is a flow diagram of an example method for generating blur data which can be implemented in the computing environment illustrated in FIG. 1.

FIG. 7 is a flow diagram of an example method 500 for generating blur data, where the blur data may be used to display maps with constant apparent blur radii during zooming. The method 500 may be implemented in the radius-specific blur engine 120, for example.

At block 502, a description of the water geometry is generated. For example, the radius-specific blur engine 120 may generate a water coverage raster image, such as the water coverage raster image 320, from high resolution images in the high resolution map database 122. For example, the water coverage raster image may be a binary image with land represented by black color pixels and water represented by white color pixels, or vise versa. In some implementations, the water coverage raster image may be generated directly from a vector graphics representation of a map tile area, such as a scalable vector graphics (SVG) or adobe illustrator (AI) representation.

Next (block 504), a full-radius blur raster image is generated based on the water coverage raster image. For example, a Gaussian blur function, as known in the industry, may be applied to the water coverage raster image such that a pixel values are convolved with a Gaussian distribution of neighboring pixel values. The radius used in the Gaussian blur function may be the "full-radius," as discussed above, for example.

In addition, a fractional-radius blur raster image is generated based on the water coverage raster image (block 506). For example, the radius-specific blur engine 120 may apply a Gaussian blur function to the water coverage raster image with a radius smaller than that of the radius used to generate the full-radius blur raster image. The fractional-radius blur raster image will thus be less "blurry" than the full-radius blur raster image, or the apparent blur radius is smaller for the fractional-radius blur raster image.

At block 508, the blur data (i.e. the water coverage, full-radius blur, and fractional-radius blur raster images) is stored in a blur database to be made available for servicing client requests. For example, when a client device requests map content for a digital map, the map content server 106 may send blur data along with corresponding background raster images and vector content to the client device.

Figure 8:
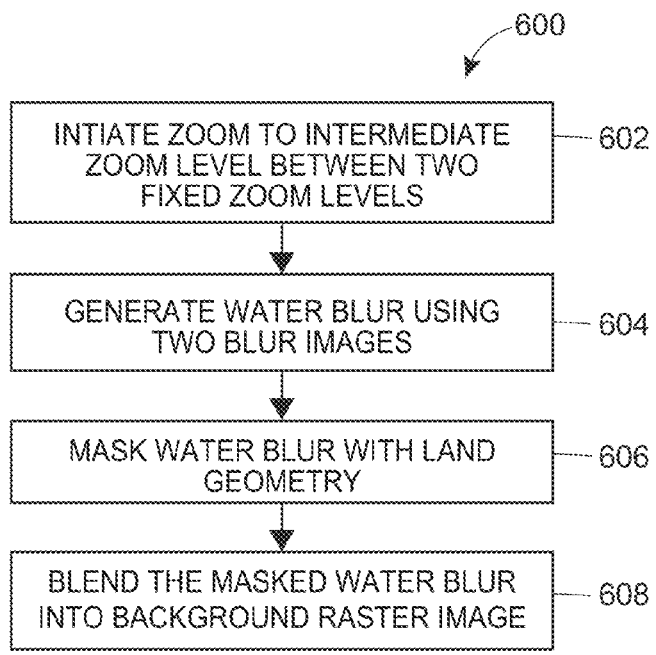
FIG. 8 is a flow diagram of an example method for displaying a digital map including water color gradients which can be implemented in the computing environment illustrated in FIG. 1.

FIG. 8 illustrates an example method 600 for displaying a digital map including water color gradients, where the water color gradients have a constant apparent blur radius during zooming. The method 600 may be implemented in client device 150, for example.

At block 602, a zoom event is initiated for zooming a digital map to an intermediate zoom level between two fixed zoom levels. For example, a user of the client device 150 may initiate a "zoom in" or "zoom out" event using a mouse click, button, scrollbar, trackball, touchsceen, etc. interface. In some scenarios, the two fixed zoom levels may be discrete zoom levels used by a mapping application, or, in other scenarios, the two fixed zoom levels may be any fraction or multiple of discrete zoom levels. For example, a user may click on a "zoom in" or "zoom out" button to initial a zoom between discrete zoom levels, such as a zoom from zoom level five to zoom level six. Alternatively, a user may use a continuously variable scrollbar to zoom to any desired zoom level between two zoom boundaries, for example.

At block 604, a blur is generated for displaying a boundary between land and water in the digital map at the intermediate zoom level. For example, the water depiction module 168 may blend full-radius blur and fractional-radius blur raster images to generate a blur for the intermediate zoom level. In some implementations, the ratio of full-radius blur raster image to fractional-radius blur raster image in the blend is proportional to how far, on a scale of zoom levels, the intermediate zoom level is from the originally displayed zoom level (i.e. from where the zoom event was initiated). In this way, the apparent blur radius of the water color gradient at the intermediate zoom level is the same as the apparent blur radius of the water color gradient at the original zoom level.

Next (block 606), a mask is applied to the blur such that depictions of water have a color gradient and depictions of land do not have a color gradient. For example, the water depiction module 168 may use a water coverage raster image as a mask to "cut off" parts of the blur that are over land. Alternatively, the water depiction module 168 may use a edge detection routine executed on the water coverage raster image to identify and select portions of the blur that are over water.

Then, the masked blur is blended with a background raster image to generate a raster map tile for display (block 608). For example, the water depiction module 168 may use arithmetic or statistical blend modes, as known in the industry to blend the masked blur with the background raster image, thus generating water color gradients. In some implementations, the masked blur may be rendered to a texture to generate water color gradients in the background raster image.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In some embodiments, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a SaaS. For example, as indicated above, at least some of the operations may be performed by a group of computers (as examples of machines including processors), these operations being accessible via a network (e.g., the Internet) and via one or more appropriate interfaces (e.g., APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for generating stylized water gradients through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A method in a network device for generating a description of a raster map image that includes a representation of a body of water having a color gradient that appears constant in response to a zoom operation, the method comprising:
   generating a description of geometry of the body of water, for a selected geographic area;
   using a raster representation of the body of water having a color gradient, generating (i) a first blur raster image using a first blur radius and (ii) a second blur raster image using a second blur radius different from the first blur radius; and
   providing the description of the geometry of the body of water, the first blur raster image, and the second blur raster image to a client device via a communication network, for generating raster map images of the selected geographic area, wherein the description of the geometry, the first blur raster image, and the second blur raster image, when combined, generate a representation of coastline water having a darker color than non-coastline water, and wherein a width in pixels of the representation of the coastline water remains constant at multiple zoom levels.

2. The method of claim 1, wherein generating the description of the geometry of the body of water includes generating a binary raster image in which all water is represented with a first color and all non-water is represented with a second color.

3. The method of claim 2, wherein:
   the first blur raster image, when masked with the binary raster image representative of the geometry of the body of water, results in the water being rendered with a different shade of blue within a first number of pixels from a boundary with the land, wherein the first number of pixels corresponds to a first zoom level, and
   the second blur raster image, when masked with the binary raster image representative of the geometry of the body of water, results in the water being rendered with the different shade of blue within a second number of pixels from the boundary with the land, wherein the second number of pixels corresponds to the second zoom level,
   wherein the client device generates representations of the body water at zoom levels between the first zoom level and the second zoom level using interpolation between the first blur raster image and the second blur raster image.

4. The method of claim 2, further comprising:
   providing a background raster image for the selected geographic area to the client device, wherein the background raster includes a plurality of colors in addition to the colors used in the description of the geometry of the body of water, and wherein the client device generates the raster map image using (i) the description of the geometry of the body of water, (ii) the first blur raster image, (iii) the second blur raster image, and (iv) the background raster image.

5. The method of claim 4, further comprising:
   providing a definition of a plurality of map elements disposed in the geographic area in a vector graphics format, wherein to generate the raster map image, the client device further renders the plurality of map elements and blends the rendered plurality of map elements onto the raster map image.

6. The method of claim 2, wherein providing the description of the geometry of the body of water, the first blur raster image, and the second blur raster image to the client device includes encoding each of the binary raster image, the first blur raster image, and the second blur raster image in a different one of a red color channel, a green color channel, and a blue color channel according to an RGB encoding scheme.

7. The method of claim 1, further comprising:
receiving, from the client device, a request for a map tile of a fixed size, wherein the request specifies a geographic region and a zoom level;
wherein:
the description of the geometry of the body of water, the first blur raster image, and the second blur raster image are provided as part of a definition of the requested map tile,
the first blur raster image corresponds to the specified zoom level, and
the second blur raster image corresponds to a zoom level adjacent to the specified zoom level.

8. The method of claim 1, further comprising:
using the raster representation of the body of water, generating a third blur raster image using a third blur radius different from the first blur radius and the second blur radius; and
further providing the third blur raster image to the client device.

9. The method of claim 1, wherein generating the first blur raster image and the second blur raster image includes using a Gaussian blur technique.

10. The method of claim 1, wherein the second blur radius is one half of the first blur radius.

11. A method in a computing device for scaling a raster image for a selected geographic area, wherein the raster image includes a representation of a body of water having a color gradient, the method comprising:
receiving a description of geometry of the body of water for a selected geographic area;
receiving a first blur raster image and a second blur raster image for rendering the body of water with a color gradient, wherein the first blur raster image and the second blur raster image are associated with a first blur radius and a second blur radius, respectively;
generating a raster image for a starting zoom level using the description of geometry of the body of water and the first blur raster image; and
generating a plurality of raster images at different zoom levels other than the starting zoom level using the description of the geometry of the body of water, the first blur raster image, and the second blur raster image, including:
generating a representation of coastline water a darker color, the representation having a fixed width in pixels at the starting zoom level, and
maintaining the width constant at the different zoom levels.

12. The method of claim 11, wherein the plurality of generated raster images appear to have a visually constant color gradient equal to the color gradient of the raster image for the starting zoom level.

13. The method of claim 12, wherein the visually constant color gradient corresponds to water being rendered using a first shade of blue within a fixed number of pixels, defining the fixed width, from a boundary with the land and a second shade of blue outside the fixed number of pixels from the boundary with the land.

14. The method of claim 11, wherein:
the description of geometry of the body of water includes a binary raster image in which all water is represented with a first color and all non-water is represented with a second color, and
generating the raster image for the starting zoom level including masking the first blur raster image with the binary raster image.

15. The method of claim 14, wherein receiving the description of the geometry of the body of water, the first blur raster image, and the second blur raster image includes receiving a respective encoding of each of the binary raster image, the first blur raster image, and the second blur raster image in a different one of a red color channel, a green color channel, and a blue color channel, according to an RGB encoding scheme.

16. The method of claim 11, wherein generating the plurality of raster images includes linearly interpolating between the first blur raster image and the second blur raster image to generate an interpolated blur raster image.

17. The method of claim 16, wherein the starting zoom level is a first zoom level, and wherein:
the first blur raster image corresponds to the first zoom level,
the second blur raster image corresponds to a second zoom level different than the first zoom level, and
the zoom levels to which plurality of raster images correspond are between the first zoom level and the second zoom level.

18. The method of claim 11, further comprising:
receiving a background raster image for the selected geographic area, wherein the raster image for the starting zoom level and each of the plurality of raster images is generated further using the background raster image.

19. A method in computing device for generating raster images having a patch of color having a non-zero color gradient, the method comprising:
receiving (i) a first blur raster image generated from the patch of color using a first blur radius corresponding to a first zoom level, (ii) a second blur raster image generated from the patch of color using a second blur radius corresponding to a second zoom level, and (iii) a description of geometry of the patch of color;
generating a raster image for the first zoom level, including generating a representation of a border of the patch color, the border having a certain width and a different color than the rest of the patch of color; and
generating a raster image for an intermediate zoom level between the first zoom and the second zoom level, including:
interpolating between the first blur raster and the second blur raster to generate an interpolated blur raster image for the intermediate zoom level, and
applying the description of geometry of the patch of color to the interpolated blur raster image to generate a representation of the border of the same width as at the first zoom level.

20. The method of claim 19, wherein generating the raster image for the intermediate zoom level includes generating a representation of the patch of color with a color gradient that appears equal to a color gradient of the patch of color rendered at the first zoom level and to a color gradient of the patch of color rendered at the second zoom level.

21. The method of claim 19, wherein the description of the geometry of the patch of color includes a binary raster image, and wherein applying the description of geometry of the patch of color to the interpolated blur raster includes masking the interpolated blur raster with the binary raster image.

22. The method of claim 19, wherein the second blur radius is a one-half of the first blur radius.

23. The method of claim 19, wherein the patch of color represents a body of water, and wherein the raster image is a portion of a digital map.

24. The method of claim 23, wherein the color gradient of the patch of color provides a stylized boundary between water and land.

* * * * *